(12) United States Patent
Riffier et al.

(10) Patent No.: US 8,047,617 B2
(45) Date of Patent: Nov. 1, 2011

(54) FLEXIBLE AXLE COMPRISING A CROSS MEMBER WITH A SHAPED CROSS-SECTION, CORRESPONDING CROSS-MEMBER, VEHICLE AND MANUFACTURING METHOD

(75) Inventors: Bruno Riffier, Fille sur Sarthe (FR); Patrice Fabbro, Vitry le Francois (FR); Raymond Deslande, Loisy sur Marne (FR); Jacques Foulquier, Le Mans (FR)

(73) Assignee: Auto Chassis International SNC (FR)

( * ) Notice: Subject to any disclaimer, the term of this patent is extended or adjusted under 35 U.S.C. 154(b) by 0 days.

(21) Appl. No.: 11/792,545

(22) PCT Filed: Dec. 3, 2005

(86) PCT No.: PCT/EP2005/056618
§ 371 (c)(1),
(2), (4) Date: Mar. 7, 2008

(87) PCT Pub. No.: WO2006/061424
PCT Pub. Date: Jun. 15, 2006

(65) Prior Publication Data
US 2008/0150349 A1 Jun. 26, 2008

(30) Foreign Application Priority Data
Dec. 8, 2004 (FR) .................................. 04 13084

(51) Int. Cl.
*B60G 21/05* (2006.01)

(52) U.S. Cl. ..................................... 301/127; 301/124.1
(58) Field of Classification Search ................ 301/124.1, 301/127; 280/124.106, 124.116, 124.166
See application file for complete search history.

(56) References Cited

U.S. PATENT DOCUMENTS

| | | | | |
|---|---|---|---|---|
| 2,069,911 | A | * | 2/1937 | Bourdon ....................... 267/188 |
| 4,787,680 | A | * | 11/1988 | Bonjean et al. ............ 301/124.1 |
| 6,145,271 | A | | 11/2000 | Koessmeier et al. ......... 52/735.1 |
| 6,460,869 | B1 | * | 10/2002 | Tremouilles ........... 280/124.116 |
| 6,487,886 | B2 | * | 12/2002 | Ueno et al. ........................ 72/57 |
| 6,510,763 | B1 | * | 1/2003 | Streubel et al. ................. 74/588 |
| 6,523,841 | B2 | * | 2/2003 | Glaser et al. ........... 280/124.106 |
| 6,616,157 | B2 | * | 9/2003 | Christophliemke et al. ...................... 280/124.106 |
| 6,758,921 | B1 | * | 7/2004 | Streubel et al. ............... 148/593 |
| 7,204,498 | B2 | * | 4/2007 | Alesso et al. .......... 280/124.106 |
| 7,377,041 | B2 | * | 5/2008 | Ok et al. ........................ 29/897.2 |
| 2002/0117890 | A1 | * | 8/2002 | Glaser et al. .................. 301/127 |
| 2002/0190495 | A1 | * | 12/2002 | Hamada et al. ........ 280/124.166 |
| 2004/0256828 | A1 | * | 12/2004 | Han et al. ............... 280/124.106 |

FOREIGN PATENT DOCUMENTS

| | | |
|---|---|---|
| EP | 0 752 332 A1 | 1/1997 |
| EP | 1 080 954 A2 | 3/2001 |

* cited by examiner

*Primary Examiner* — Kip T Kotter
(74) *Attorney, Agent, or Firm* — Westman, Champlin & Kelly

(57) ABSTRACT

A flexible axle for motor vehicle has a cross-member (1) connecting two longitudinal arms (2), wherein said cross-member (1) has a closed cross-section, and said cross-member has, at least in a central zone, a substantially trapezoid cross-section (11).

20 Claims, 2 Drawing Sheets

US 8,047,617 B2

FLEXIBLE AXLE COMPRISING A CROSS MEMBER WITH A SHAPED CROSS-SECTION, CORRESPONDING CROSS-MEMBER, VEHICLE AND MANUFACTURING METHOD

CROSS-REFERENCE TO RELATED APPLICATION

This Application is a Section 371 National Stage Application of International Application No. PCT/EP2005/056618, filed Dec. 8, 2005, and published as WO 2006/061424 A1 on Jun. 15, 2006, not in English.

The field of the disclosure is that of motor vehicles. More precisely, the disclosure concerns flexible axles for motor vehicles.

Let us recall that what is called a flexible axle generally refers to an axle designed to form a torsion element between two wheels.

Classically, a flexible axle comprises two longitudinal arms each of them bearing the wheel mountings and connected by a transversal linking element known as the cross-member axle, dead axle or profile axle.

During the design of an axle, two quantities, among others, are considered when appreciating the qualities of the axle: flexing and torsion.

The principle of flexible axles allows the reconciling of a high stiffness to flexing with a relative flexibility to torsion. In general, it is through the geometries of the cross section of the cross-member, via its flexion and torsion inertia, that a desired compromise is obtained between stiffness to flexing and flexibility (relative) to torsion.

The cross sections selected to produce steel axles (or other isotropic materials) have often "V", "U", or "L" shapes, since these types of geometric provide an interesting relationship between flexion and torsion inertia.

Recent years have seen the large scale deployment of the technique of flexible axles in segments of the lower and medium range automobile construction, thanks to its numerous advantages, among which are an excellent service duty/architecture compromise, and economic implementation principally employing mechanical welding type assemblies.

These advantages lead suspension designers to continually push the technique towards more and more refinement. The flexible axles are in fact prone to a certain number of limitations among which is a delicate compromise between longitudinal and transversal stiffness and a durability conditioned by the endurance behaviour of both components which are subject to large elastic deformations.

The continually rising demand for comfort and road holding points the design of flexible cross-member axles towards solutions consisting of introducing a torsion stiffness element between the two trailing arms, commonly known as an "anti-roll bar" or "Panhard rod", with the aim of limiting the canting of the vehicle while preserving great vertical flexibility of the suspension train, guaranteeing a filtering out of road imperfections from the chassis.

But the continual enlarging of the perimeter of applying the technique of flexible axles to high mass vehicles (large saloon cars, mini vans, people carriers and even utility vehicles) without lowering the quality of the ride, continually leads to components that are working within their absolute limits of operation, whether through static resistance to incidental forces, or metal fatigue behaviour during the life cycle of the suspension train.

The linking element, or cross-member, is thus one of the most difficult components to design, particularly from the point of view of endurance and behaviour.

At present, on flexible cross-member axles, the cross-member linking the longitudinal arms are produced using two different technologies.

In one technology, the cross-member is manufactured from a bent section (or pressed steel) in such a way as to procure a cross section having an U-shaped, V-shaped or L-shaped form. These cross-members generally have to be associated with an anti-roll bar, to provide torsion stiffness to the axle.

The second technology consists of integrating the anti-roll stiffness function in the cross-member itself.

In this case, the cross-member is manufactured from a tube, generally having a circular section, with the tube then being submitted, at least in its central part, to a deforming process in which a portion of the wall is crushed inwards towards another portion of the wall in order to provide the desired stiffness torsion and flexion (example: Peugeot 806®, illustrated in FIG. 1, or the Opel Zafira®, illustrated in FIG. 2).

The diversity of anti-roll stiffness in function of the needs is ensured by modifying the cross section of the cross-member.

This disclosure applies to axle cross-members produced according to this second technology, those currently designated by the term "closed profile axles" or "closed section axles".

In a general manner, the disclosure applies to all flexible axles using a cross-member constituted from a tube having in its central region a concavity with U-shaped or V-shaped cross section.

The tube of the cross-member is only crushed in one transversal portion to reduce torsion, and retains its circular sections at the extremities, in order to facilitate the connection to the suspension arms via welding.

Moreover, the cross-members of these axles possess at least one rectilinear generatrix of the profile that links the two extremities.

This traditional design of closed section cross-members has the consequence that the centre of torsion of the median section cannot be very far from the initial axis of the tube, due to its geometry. Only a rotation of the cross-member around its axis permits any angular modification of the centre of torsion position.

But certain requirements of vehicle manufacturers as to the behaviour of the axle are incompatible with a low offset between the centre of torsion of the axle and the axis of the tube constituted by the centres of the circular sections at its extremities.

In fact, the degree of travel induced by a rolling movement is such that it requires an important vertical translation of the central section.

Furthermore, this incompatibility is in certain cases accentuated by architecture constraints. These constraints in fact lead, in certain cases, to reconsidering the space occupied by the cross-member in relation to the exhaust pipe.

SUMMARY

One aspect of the present disclosure is a flexible axle for motor vehicles and comprises a cross-member linking two longitudinal arms, characterised by said cross-member having a closed section. The cross-member presents, at least in one central region, an upper section comprising two sides that incline inwardly toward a flat upper surface.

In this manner, we significantly offset the centre of torsion of the axle in relation to an axis corresponding to the axis of the tube before its deformation.

The behaviour of the corresponding axle is thus considerably improved.

According to one preferred embodiment, said cross-member presents a bent section, said cross-member preferably having at each of its extremities a circular section.

According to one preferred embodiment, the centre of inertia of the central section of said cross-member is distant from a straight line passing through the inertia centres of the sections of the extremities of said cross-member.

In this manner, a bending of the cross-member is achieved and its effect is added to that of the shaped cross section of the cross-member in its central region, thus contributing to increasing the offset of the centre of torsion and, consequently, to the stiffness of the axle.

Moreover, the sections of the extremity of the cross-member may thus be positioned beneath an exhaust pipe in an architecture according to which the path of the exhaust pipe passes above the cross-member by going above a section of the extremity of the cross-member on the left hand side of the vehicle.

In one aspect, the disclosure concerns a cross-member intended to link two longitudinal arms on a flexible axle of a motor vehicle, and characterised in that it has a closed section. The cross-member presents, at least in one central region, an upper section comprising two sides that incline inwardly toward a flat upper surface.

In one aspect, the disclosure also concerns a vehicle equipped with a flexible axle for a motor vehicle, comprising a cross-member linking two longitudinal arms, and characterised in that said cross-member has a closed section. The, cross-member presents, at least in one central region, an upper section comprising two sides that incline inwardly toward a flat upper surface.

In one aspect, the disclosure likewise concerns a procedure for manufacturing a cross-member intended to cross link the two longitudinal arms of a motor vehicle flexible axle, and characterised in that it has a manufacturing step consisting of deforming a cross-member with a closed section in such a manner that said cross-member presents, at least in one central region, an upper section comprising two sides that incline inwardly toward a flat upper surface.

Preferably, the procedure comprises a deformation phase of said cross-member providing a bent section between its central region and its two extremity sections.

According to one advantageous embodiment, said deformation phase is carried out in two steps, one consisting of producing a pre-deformation in at least one transition zone between said central region and a region of circular section close to at least one of its extremities, the other step consisting of continuing the deformation in said central region in order to confer its final shape.

Advantageously, said deformation phase is carried out via pressing.

Preferably, the procedure comprises a step consisting of bending said cross-member in such a manner that the centre of inertia of the central section of said cross-member is distant from a straight line passing through the centre of inertia of the sections at the extremities of said cross-member.

Other characteristics and advantages of the subject matter of this disclosure will appear more clearly on reading the following description and according to a preferred mode of producing a flexible axle, given here by way of an illustrative and non limitative example.

DETAILED DESCRIPTION

As mentioned previously, a principle of the present disclosure is the fact of producing a flexible axle with a cross-member whose closed section presents, at least in the central region of the cross-member, an upper section comprising two sides that incline inwardly toward a flat upper surface.

By central region, is meant a portion of the length of the cross-member more or less extended, and centered between the two extremities of the cross-member.

Figure 3:
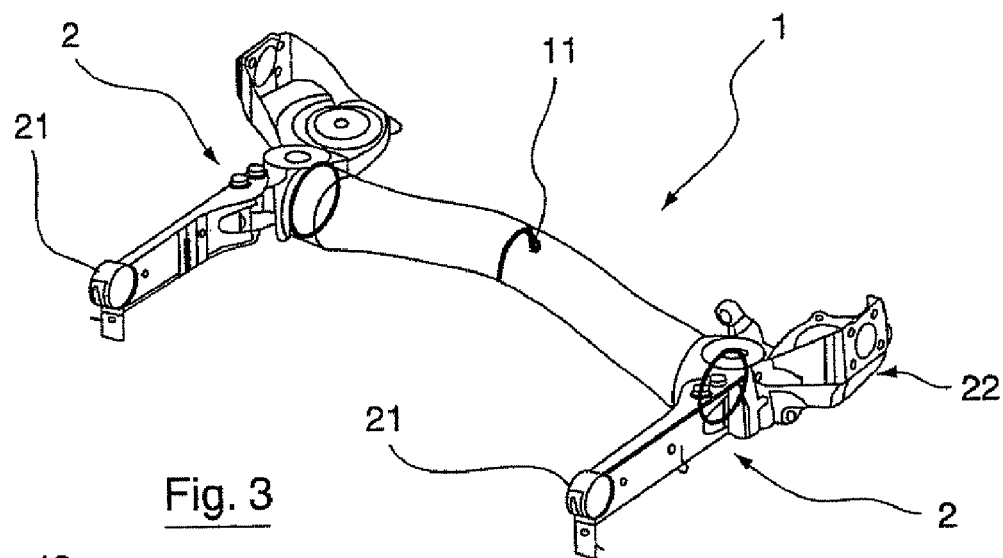
FIG. 3 is a perspective view of a flexible axle according to the present disclosure.

This is illustrated in FIG. 3 which shows such a flexible axle comprising a cross-member, as previously mentioned, linking the two longitudinal arms 2.

You are reminded that the axle is connected to the body of the vehicle via articulated bushed links 21 borne in the longitudinal arms 2, these latter each present at their extremity bushes 21, and an axle head 22 intended to bear a turning part.

Figure 5:
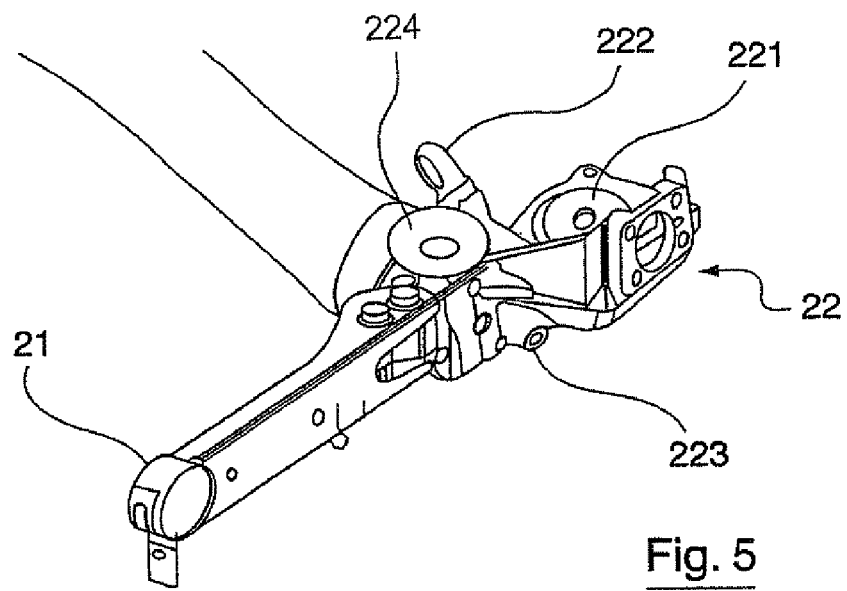
FIG. 5 is a partial view of the axle according to the present disclosure as illustrated in FIG. 3.

As shown in FIG. 5, each axle head 22 is, according to the present embodiment, made solid with:

a spring seat 221 a clevis 222 for fixing a Panhard Bar® a thrust piece 223 for a spring seat.

Each axle head 22 has as well a means of fixing 224 intended for attaching a shock absorber to the axle.

We also note that each arm 2 comprises a forward part (bearing bush 21) fixed by bolts to the axle head 22.

Figure 4:
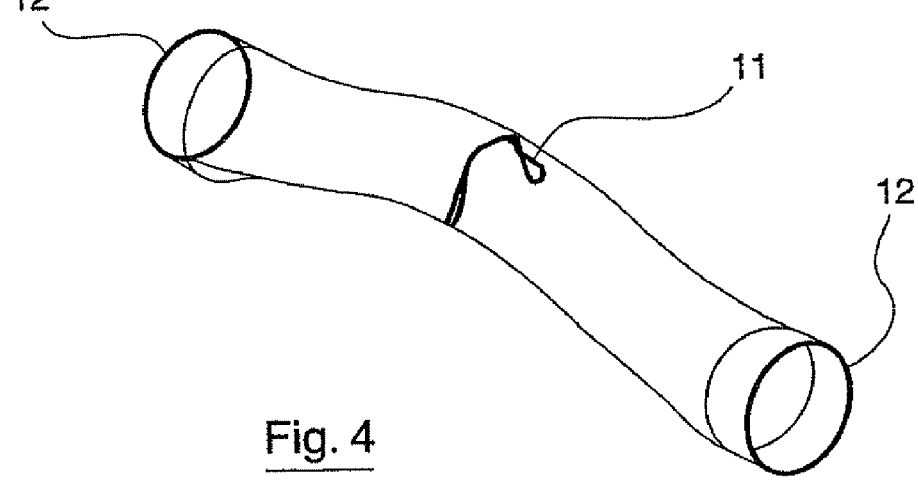
FIG. 4 is a perspective view of the cross-member of a flexible axle according to the present disclosure.

In reference to FIG. 4, an axle cross-member according to the present disclosure has a central part with an upper section comprising two sides that incline inwardly toward a flat upper surface (shown by the dark line in FIG. 4).

Moreover, the section of the cross-member is formed in such a way that it progressively changes from the shape in its central part to a circular shape at its extremities 12.

Furthermore, cross-member 1 has a bent shape. In other words, the cross-member presents a longitudinal deformation produced in such a way that the centre of inertia at the median level of the cross-member is offset in relation to a straight line connecting the centres of circular extremity sections 12.

Thus, on such a described cross-member, the centre of torsion of the central section, and all the connected deformed sections, is offset upwards to the maximum in order to obtain an equivalent centre of torsion as high as possible.

By equivalent centre of torsion of the cross-member is meant all the positions of the centres of torsion of all the sections of the cross-member.

A cross-member, such as is shown in FIG. 4 is produced by metal forming deformation of the cross-member in order to obtain the maximum offset of the central section while conserving a radius of curvature as great as possible while mastering the process.

Figure 1:
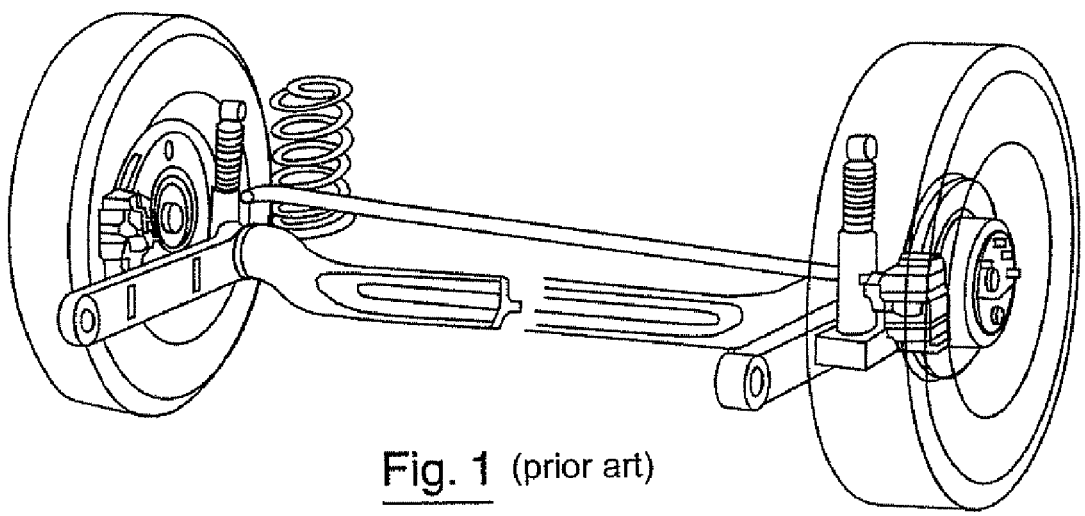
FIGS. 1 and 2 are each views of an axle comprising a cross-member with closed section according to prior art.
Figure 2:
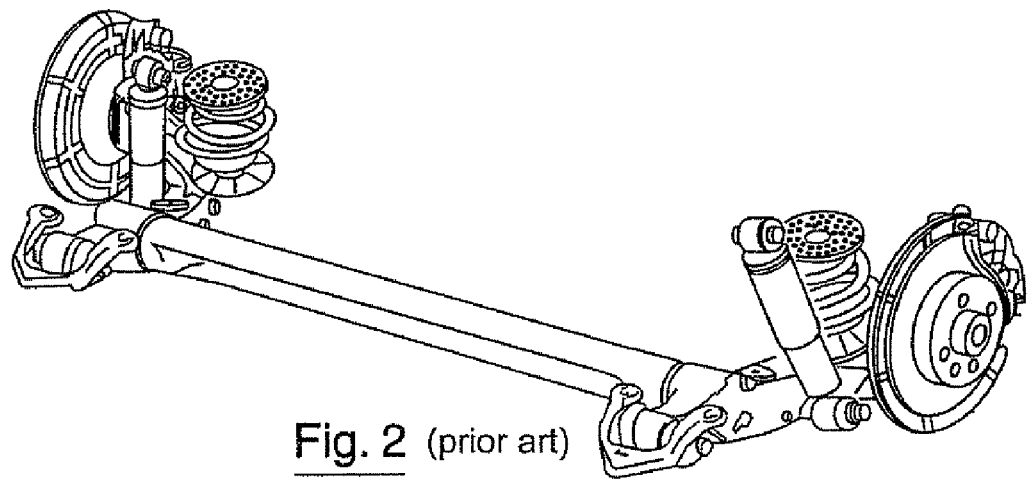
Figure 6:
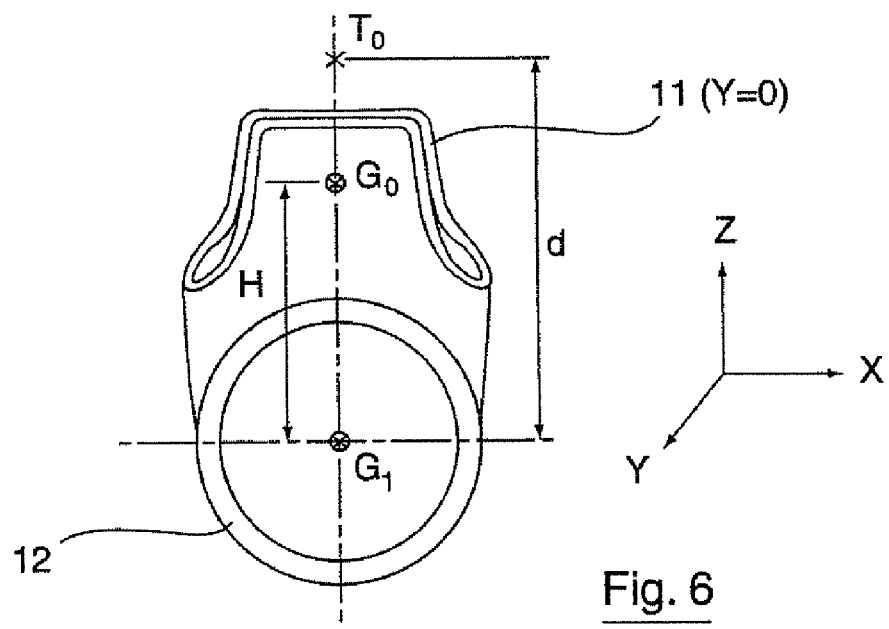
FIG. 6 is a view of two transversal sections of the cross-member of an axle according to the present disclosure.

FIG. 6 shows, in cross section, the positioning of the shaped section 11 in the median plane (note Y =0) of the axle in relation to the extremity sections 12.

The following elements are shown in this Figure:
$T_0$, which represents the centre of torsion of the median section of the axle;
$G_0$, which represents the centre of inertia of the median section of the axle;
$G_1$, which represents the centre of inertia of extremity section 12.

We note, as clearly shown, that points $T_0$, $G_0$ and $G_1$ are aligned.

Moreover, the metal forming deformation in direction Z leads to the sides H (between $G_0$ and $G_1$) and d (between $T_0$ and $G_1$) being determined in such a way as to optimise the position of $T_0$ in direction Z, i.e., to maximise distance d.

In an exemplary embodiment, a flexible axle for a motor vehicle comprises a cross-member linking two longitudinal arms. The cross-member is formed from a tubular element, wherein the tubular element in a central region of the cross-member is formed into a substantially three-portion configuration comprising a central portion and two side portions. Each side portion has a distal end and a distance between the two distal ends is greater than a length of the central portion. Further, the cross-member has two extremities, each extremity having a cross section. A centre of inertia of the central region is outside a closed shape formed by a set of lines joining each point on each of the two cross sections, each line of the set of lines being a straight line from a first point on one cross section to a closest point on the other cross section. In one aspect of an exemplary embodiment, the central region is outside the closed shape. In another aspect of an exemplary embodiment, a centre of torsion of the central region is outside the closed shape. In another aspect of an exemplary embodiment, a cross-sectional plane of the central region has a centre of torsion and a centre of inertia; in the plane, the centre of torsion is not at the same location as the centre of inertia. In still another aspect of an exemplary embodiment, a distance between the centre of torsion of the central region and a straight line passing through centres of inertia of the extremities is greater than a distance between the centre of inertia of the central region and the straight line passing through the centres of inertia of the extremities. In still another aspect of an exemplary embodiment, the central portion of the central region is disposed higher than the extremities.

To manufacture an axle in the previously described manner, steps are carried out that consist of:
  cutting a circular section tube to a predetermined length;
  bending the tubular length thus obtained by fixing its two extremities and applying, with the aid of a press, a force significantly perpendicular to the axis of the tubular section;
  deforming the curved section in such a way that it presents a bowed section in its central section.

It is noted that the deformation phase is carried out in two steps:
  one consisting of preparing a transition zone between the final central region and the circular section (i.e., a non deformed region at the end of the deformation phase) and close to the extremities of the cross-member;
  the other consisting of pressing the pre-deformed cross-member in order to obtain the desired shape for the central section of the cross-member.

The present disclosure is directed to the aim of providing a flexible axle whose closed profile cross-member permits a considerable increase in the torsion stiffness of the axle in relation to solutions of the prior art.

The disclosure equally aims to provide an axle that can be adapted to new architectures, particularly in relation to the positioning of the exhaust pipe.

The disclosure also aims to provide a manufacturing procedure for the cross-member of such an axle.

The invention claimed is:

1. A flexible axle for a motor vehicle, comprising a cross-member linking two longitudinal arms, wherein said cross-member is formed from a tubular element, wherein the tubular element in a central region of the cross-member is formed into a substantially three-portion configuration comprising a substantially flat central portion and two side portions, each side portion having a distal end, wherein a distance between the two distal ends is greater than a length of the central portion; and further wherein the cross-member has two extremities, each extremity having a cross section, and wherein a centre of inertia of the central region is outside a closed shape formed by a set of lines joining each point on each of the two cross sections, each line of the set of lines being a straight line from a first point on one cross section to a closest point on the other cross section.

2. A flexible axle according to claim 1, wherein the cross-member has a bent section.

3. A flexible axle according to claim 1, wherein said cross-member has at each of its extremities a circular section.

4. A flexible axle according to claim 3, wherein the central region of said cross-member is outside the closed shape.

5. The flexible axle according to claim 1, wherein a centre of torsion of the central region is outside the closed shape.

6. The flexible axle according to claim 1, wherein a cross-sectional plane of the central region has a centre of torsion and a centre of inertia and wherein, in the plane, the centre of torsion is not at the same location as the centre of inertia.

7. The flexible axle according to claim 6, wherein a distance between the centre of torsion of the central region and a straight line passing through centres of inertia of the extremities is greater than a distance between the centre of inertia of the central region and the straight line passing through the centres of inertia of the extremities.

8. An axle cross-member intended to link two longitudinal arms on the flexible axle of a motor vehicle is formed from a tubular element, wherein the tubular element in a central region of the cross-member is formed into a substantially three-portion configuration comprising a substantially flat central portion and two side portions, each side portion having a distal end, wherein a distance between the two distal ends is greater than a length of the central portion; and further wherein the cross-member has two extremities, each extremity having a cross section, and wherein a centre of inertia of the central region is outside a closed shape formed by a set of lines joining each point on each of the two cross sections, each line of the set of lines being a straight line from a first point on one cross section to a closest point on the other cross section.

9. The cross-member according to claim 8, wherein the central region is outside the closed shape.

10. The cross-member according to claim 8, wherein a centre of torsion of the central region is outside the closed shape.

11. The cross-member according to claim 8, wherein a cross-sectional plane of the central region has a centre of torsion and a centre of inertia and wherein, in the plane, the centre of torsion is not at the same location as the centre of inertia.

12. A motor vehicle equipped with a flexible axle for the motor vehicle, comprising a cross-member linking two longitudinal arms, wherein said cross-member is formed from a tubular element, wherein the tubular element in a central region of the cross-member is formed into a substantially three-portion configuration comprising a substantantially flat central portion and two side portions, each side portion having a distal end, wherein a distance between the two distal ends is greater than a length of the central portion; and further wherein the cross-member has two extremities, each extremity having a cross section, and wherein a centre of inertia of the central region is outside a closed shape formed by a set of lines joining each point on each of the two cross sections, each line of the set of lines being a straight line from a first point on one cross section to a closest point on the other cross section.

13. The motor vehicle according to claim 12, wherein the central portion of the central region is disposed higher than the extremities.

14. The motor vehicle of claim 12 wherein a centre of torsion of the central region of said cross-member is outside the closed shape.

15. The motor vehicle of claim 12 wherein the centre of inertia of the central region, the centre of torsion of the central region, and a centre of inertia of the extremities are vertically aligned.

16. A manufacturing method for a cross-member intended to link two longitudinal arms on a flexible axle of a motor vehicle, comprising:
deforming a tubular element in such a manner that said tubular element possesses, in a central region, a substantially three-portion configuration comprising a substantantially flat central portion and two side portions, each side portion having a distal end, wherein a distance between the two distal ends is greater than a length of the central portion; and further wherein the tubular element has two extremities, each extremity having a cross section, and wherein a centre of inertia of the central region is outside a closed shape formed by a set of lines joining each point on each of the two cross sections, each line of the set of lines being a straight line from a first point on one cross section to a closest point on the other cross section.

17. The manufacturing method according to claim 16, comprising a deformation phase of said cross-member carried out in such a manner as to form a bent section between its central region and its two extremity sections.

18. The manufacturing method according to claim 17, wherein said deformation phase comprises:
carrying out a pre-deformation in at least one transition zone between said central region and a circular section in a region of at least one of its extremity sections; and
continuing the deformation in said central region in order to give the cross-member its final shape.

19. The manufacturing method according to claim 17, wherein said deformation phase is carried out by pressing.

20. The manufacturing method according to claim 17, comprising:
bending said cross-member in such a manner that a centre of torsion of the central region of said cross-member is outside the closed shape.

* * * * *

UNITED STATES PATENT AND TRADEMARK OFFICE
CERTIFICATE OF CORRECTION

| | | |
|---|---|---|
| PATENT NO. | : 8,047,617 B2 | Page 1 of 1 |
| APPLICATION NO. | : 11/792545 | |
| DATED | : November 1, 2011 | |
| INVENTOR(S) | : Bruno Riffier | |

It is certified that error appears in the above-identified patent and that said Letters Patent is hereby corrected as shown below:

Title page, item 73, add -- Arcelormittal Tubular Products Vitry, France --

Signed and Sealed this
Twenty-eighth Day of February, 2012

David J. Kappos
*Director of the United States Patent and Trademark Office*